US012732323B2

(12) United States Patent
Ohara

(10) Patent No.: US 12,732,323 B2
(45) Date of Patent: Sep. 8, 2026

(54) TERMINAL, COMMUNICATION METHOD, BASE STATION, AND COMMUNICATION SYSTEM FOR COMMUNICATING TRACKING REFERENCE SIGNAL

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 373 days.

(21) Appl. No.: 18/286,314

(22) PCT Filed: May 10, 2021

(86) PCT No.: PCT/JP2021/017776

§ 371 (c)(1),
(2) Date: Oct. 10, 2023

(87) PCT Pub. No.: WO2022/239088

PCT Pub. Date: Nov. 17, 2022

(65) Prior Publication Data

US 2024/0195566 A1 Jun. 13, 2024

(51) Int. Cl.

*H04W 72/04* (2023.01)
*H04B 7/06* (2006.01)
*H04L 5/00* (2006.01)
*H04W 24/10* (2009.01)
*H04W 80/02* (2009.01)

(52) U.S. Cl.

CPC ......... *H04L 5/0051* (2013.01); *H04B 7/0626* (2013.01); *H04W 24/10* (2013.01); *H04W 80/02* (2013.01)

(58) Field of Classification Search

CPC ..... H04L 5/0051; H04L 5/001; H04L 5/0048; H04L 5/0057; H04B 7/0626; H04W 24/10; H04W 80/02; H04W 72/04; H04W 76/15

See application file for complete search history.

(56) References Cited

U.S. PATENT DOCUMENTS

2019/0356444 A1 11/2019 Noh et al.
2021/0409975 A1* 12/2021 Hsieh .................... H04W 76/15

(Continued)

FOREIGN PATENT DOCUMENTS

WO 2019/225898 A1 11/2019

OTHER PUBLICATIONS

Office Action issued in Japanese Patent Application No. 2023-520607, dated Dec. 3, 2024 (6 pages).

(Continued)

*Primary Examiner* — Mahbubul Bar Chowdhury
(74) *Attorney, Agent, or Firm* — Osha Bergman Watanabe & Burton LLP

(57) ABSTRACT

In one aspect, a terminal receives, from a base station, an indication of activation or deactivation of a secondary cell and a trigger indication of a TRS (Tracking Reference Signal) via a single MAC-CE (Medium Access Control-Control Element). The terminal is configured to activate the secondary cell by using a TRS corresponding to a TRS configuration ID included in the trigger indication in a case where the indication is an indication of activation of a secondary cell. The terminal receives, from the base station, a trigger offset, information related to QCL (Quasi co-located), and a number of transmissions that are associated with the TRS configuration ID via RRC (Radio Resource Control) signaling, and applies the trigger offset, the information related to QCL, and the number of transmissions to reception of the TRS. In other aspects, a method, a base station, and a system are also disclosed.

5 Claims, 9 Drawing Sheets

(56) References Cited

U.S. PATENT DOCUMENTS

| | | | | |
|---|---|---|---|---|
| 2022/0131669 | A1* | 4/2022 | Takeda | H04W 72/23 |
| 2023/0199778 | A1* | 6/2023 | Xu | H04L 5/0094 370/329 |
| 2023/0224833 | A1* | 7/2023 | Wang | H04L 5/0098 370/350 |
| 2023/0361961 | A1* | 11/2023 | Li | H04W 72/232 |
| 2023/0412341 | A1* | 12/2023 | Jung | H04W 68/02 |
| 2024/0063991 | A1* | 2/2024 | Liu | H04L 5/001 |
| 2024/0080169 | A1* | 3/2024 | He | H04L 5/0048 |

OTHER PUBLICATIONS

International Search Report issued in PCT/JP2021/017776 on Nov. 30, 2021 (7 pages).

Written Opinion of the International Searching Authority issued in PCT/JP2021/017776 on Nov. 30, 2021 (4 pages).

CATT; "Discussion on efficient activation and de-activation mechanism for SCell in NR CA"; 3GPP TSG RAN WG1 #104b-e, R1-2102612; e-Meeting; Apr. 12-20, 2021 (8 pages).

ZTE; "Discussion on Supporting Efficient Activation/De-activation Mechanism for SCells in NR CA"; 3GPP TSG RAN WG1 #104b-e, R1-2102504; e-Meeting; Apr. 12-20, 2021 (7 pages).

3GPP TS 38.213 V16.3.0; "3rd Generation Partnership Project; Technical Specification Group Radio Access Network; NR; Physical layer procedures for control (Release 16)"; Sep. 2020 (179 pages).

3GPP TS 38.331 V16.2.0; "3rd Generation Partnership Project; Technical Specification Group Radio Access Network; NR; Radio Resource Control (RRC) protocol specification (Release 16)"; Sep. 2020 (921 pages).

* cited by examiner

FIG.3

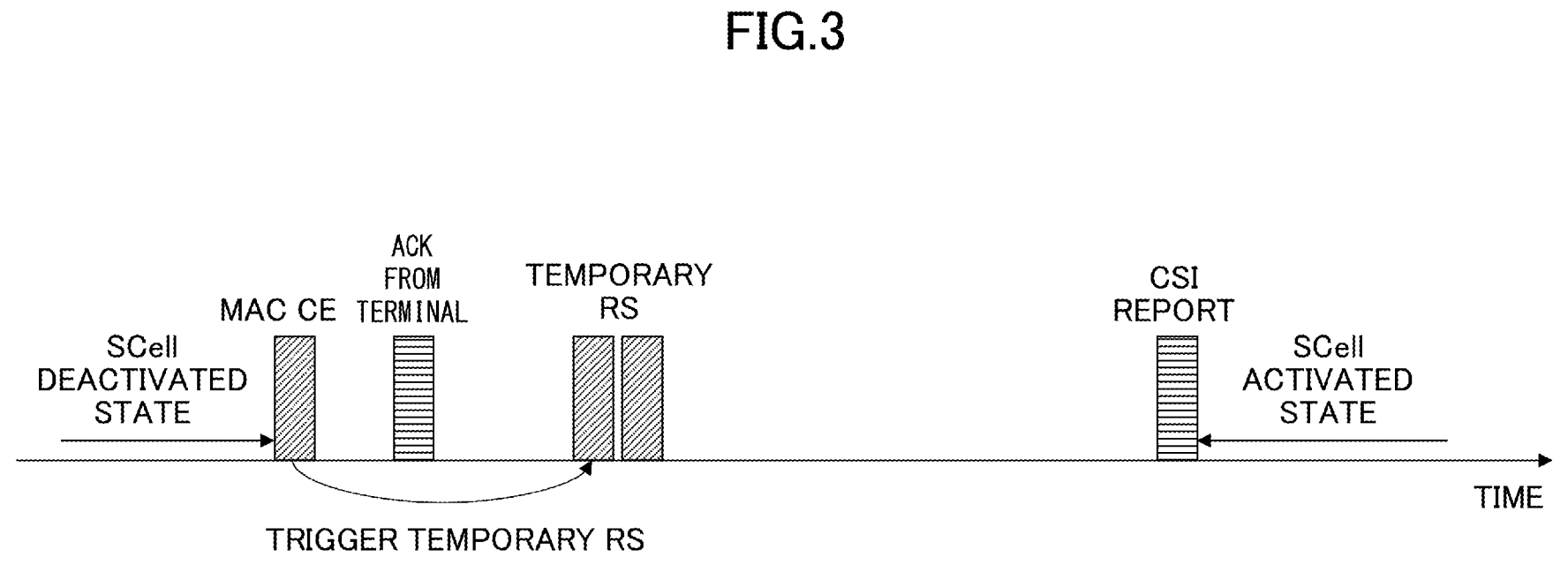

SCell
DEACTIVATED
STATE

MAC CE

ACK
FROM
TERMINAL

TEMPORARY
RS

TRIGGER TEMPORARY RS

CSI
REPORT

SCell
ACTIVATED
STATE

TIME $C_X$: INDICATION OF SCell ACTIVATION/DEACTIVATION CORRESPONDING TO SCell INDEX X
$T_X$: INDICATION OF TRIGGER OF TEMPORARY RS CORRESPONDING TO SCell INDEX X C: INDICATION OF SCell ACTIVATION/DEACTIVATION CORRESPONDING TO SPECIFIED SCell INDEX
T: INDICATION OF TRIGGER OF TEMPORARY RS CORRESPONDING TO SPECIFIED SCell INDEX $T_X$: INDICATION OF TRIGGER OF TEMPORARY RS CORRESPONDING TO SCell INDEX X $C_X$: INDICATION OF SCell ACTIVATION/DEACTIVATION CORRESPONDING TO SCell INDEX X
T: INDICATION OF TRIGGER OF TEMPORARY RS

T: INDICATION OF TRIGGER OF TEMPORARY RS

TERMINAL, COMMUNICATION METHOD, BASE STATION, AND COMMUNICATION SYSTEM FOR COMMUNICATING TRACKING REFERENCE SIGNAL

FIELD OF THE INVENTION

The present invention relates to a terminal and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., non-patent document 1).

In addition, in NR, enhancement of MR-DC (Multi RAT-Dual Connectivity) is being discussed. For example, improvement of efficiency of activation/de-activation of secondary cell groups and secondary cells is being discussed.

CITATION LIST

Non-Patent Document

Non-Patent Document 1: 3GPP TS 38.213 V16.3.0 (2020-09)

Non-Patent Document 2: 3GPP TS 38.331 V16.2.0 (2020-09)

SUMMARY OF THE INVENTION

Technical Problem

When activating a secondary cell, it is necessary to receive one or more SSBs (SS/PBCH blocks), and thus, the delay related to the secondary cell activation increases depending on the SSB period. In order to reduce the delay, triggering of a temporary RS (Reference Signal) at the time of secondary cell activation is being discussed. However, a specific method for triggering a temporary RS has not been specified.

The present invention has been made in view of the above points, and it is an object to reduce the delay related to the secondary cell activation in a wireless communication system.

Solution to Problem

According to the disclosed technique, a terminal is provided. The terminal includes: a reception unit configured to receive, from a base station, an indication of activation or deactivation of a secondary cell and a trigger indication of a temporary RS (Reference Signal) via a single MAC-CE (Medium Access Control-Control Element); a control unit configured to perform synchronization and measurement in the secondary cell by using the temporary RS, based on the trigger indication in a case where the indication is for activating the secondary cell; and a transmission unit configured to transmit, to the base station, a CSI (Channel State Information) report based on a measurement result of the temporary RS.

Advantageous Effects of Invention

According to the disclosed technique, a technique for reducing the delay related to the secondary cell activation in a wireless communication system.

BRIEF DESCRIPTION OF THE DRAWINGS

FIG. 3 is an example of an activation of a secondary cell in an embodiment of the present invention.

DETAILED DESCRIPTION OF THE PREFERRED EMBODIMENTS

Figure 1:
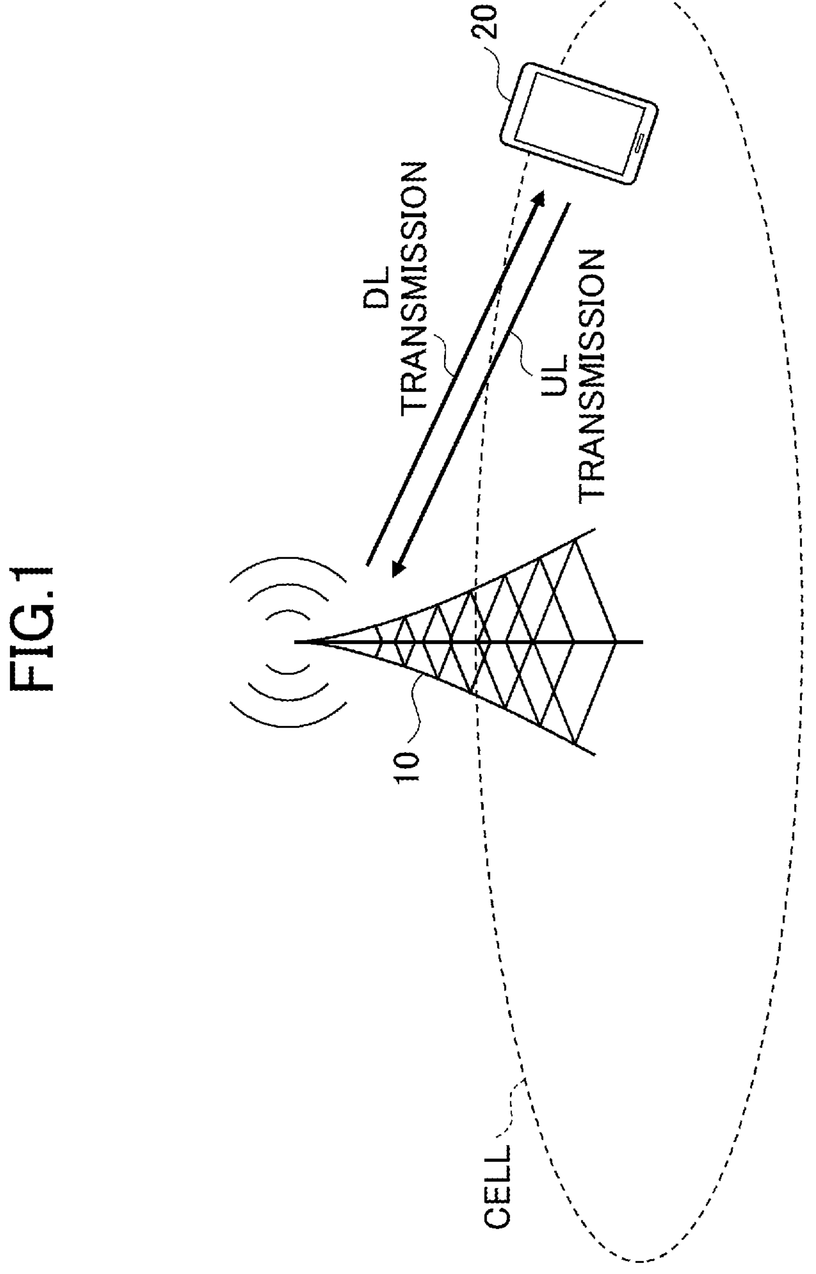
FIG. 1 is a drawing illustrating a wireless communication system in an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. In addition, a TTI (Transmission Time Interval) in the time domain may be a slot or a sub-slot, or the TTI may be a subframe.

The base station 10 can perform carrier aggregation to communicate with the terminal 20 by bundling a plurality of cells (multiple CCs (component carriers)). In carrier aggregation, one primary cell (PCell) and one or more secondary cells (SCells) are used.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH and PDCCH is called a control signal, and what is transmitted via a shared channel such as PUSCH and PDSCH is called data. These names are mere examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs). In carrier aggregation, one primary cell and one or more secondary cells are used. In addition, PUCCH-SCell having PUCCH may be used.

In addition, in NR, enhancement of MR-DC (Multi RAT-Dual Connectivity) is being discussed. For example, improvement of efficiency of activation/de-activation of secondary cell groups and secondary cells is being discussed.

The terminal 20 is enabled to deactivate a secondary cell at the time of CA operation. In a case where a secondary cell is in a deactivated state, PDCCH monitoring or the like is not performed in the secondary cell, and thus, power consumption can be reduced.

Figure 2:
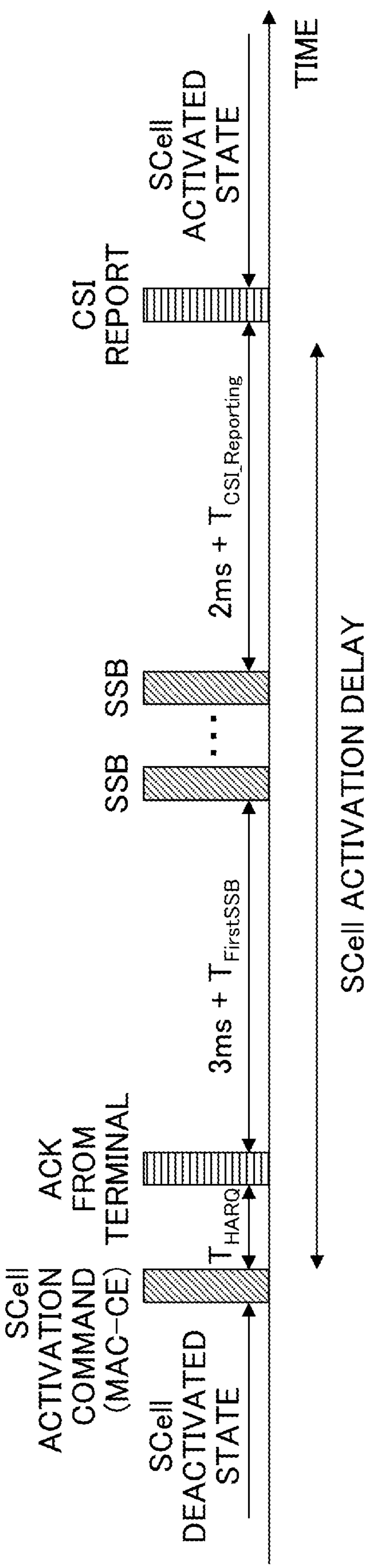
FIG. 2 is a drawing illustrating an example of an activation of a secondary cell.

When secondary cell activation is performed in order to transition from the deactivated state to the activated state, the secondary cell activation delay is required. FIG. 2 is a drawing illustrating an example of an activation of a secondary cell. Note that the example illustrated in FIG. 2 is just an example, a different secondary cell activation delay may be assumed depending on a condition whether the secondary cell is a known cell, for example, and an embodiment of the present invention may be applied to any secondary cell activation delay.

In a case where a secondary cell activation command is received in slot n, an operation at the time of activated state (for example, transmission of CSI report) will be restarted before the timing of slot $n+T_{HARQ}+T_{activation\_time}+T_{CSI\_Reporting}$.

As illustrated in FIG. 2, the $T_{HARQ}$ is time from DL transmission (including MAC-CE of the secondary cell activation command) to ACK transmission by the terminal 20. As illustrated in FIG. 2, the $T_{activation\_time}$ is 3 ms (UE processing time for MAC-CE and RF warm-up/re-tuning time)+$T_{FirstSSB}$ (time from the end of the above configured time to the first SSB resource)+2 ms (SSB processing time). The $T_{activation\_time}$ also includes AGC (Auto Gain Control) configuration time, etc. The $T_{CSI\_Reporting}$ includes time to the CSI measurement resource, UE processing time for CSI measurement and reporting, and time to the CSI reporting resource.

As described above, when performing the secondary cell activation, it is necessary to receive one or more SSBs, and thus, the secondary cell activation delay increases according to the SSB period.

In order to improve efficiency of the secondary cell activation, the secondary cell activation and the triggering of the temporary RS for the secondary cell activation may be both enabled to be performed by one or more MAC-CEs (Medium Access Control-Control Element) included in a single PDSCH. FIG. 3 is a drawing illustrating an example of an activation of a secondary cell in an embodiment of the present invention. As illustrated in FIG. 3, it has been discussed to trigger a temporary RS (Reference Signal) via a MAC-CE in order to shorten the secondary cell activation delay by using the temporary RS in lieu of an SSB. Note that, with respect to the temporary RS, it has been discussed to use a TRS (Tracking RS) as the temporary RS.

Figure 4:
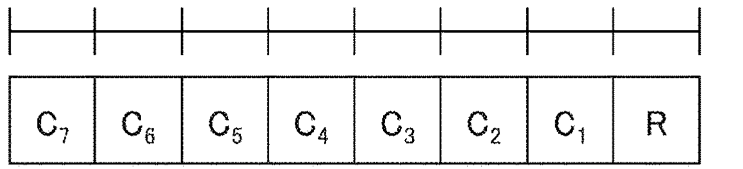
FIG. 4 is a drawing illustrating an example (1) of MAC-CE for activating a secondary cell.
Figure 5:
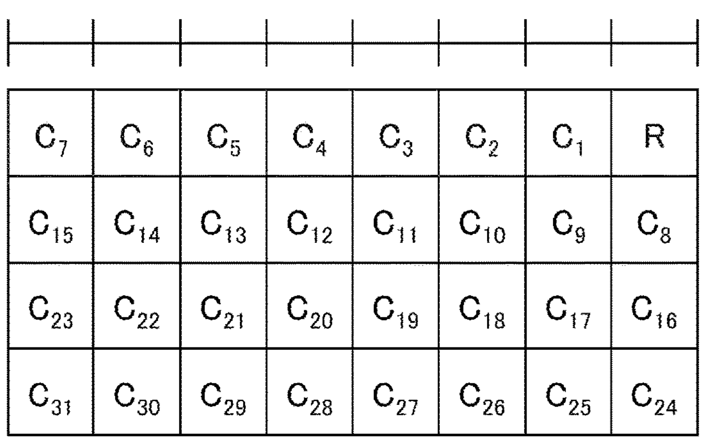
FIG. 5 is a drawing illustrating an example (2) of MAC-CE for activating a secondary cell.

FIG. 4 is a drawing illustrating an example (1) of MAC-CE for activating a secondary cell. FIG. 5 is a drawing illustrating an example (2) of MAC-CE for activating a secondary cell. In the existing NR, with respect to a plurality of secondary cells, an indication of activation or deactivation is performed via a MAC-CE as shown in FIG. 4 and FIG. 5. An indication related to up to seven (7) secondary cells is available in FIG. 4, and an indication related to up to thirty-one (31) secondary cells is available in FIG. 5. If $C_X$ shown in FIG. 4 or FIG. 5 is 1, it indicates that a secondary cell whose secondary cell index is X is activated, and if $C_X$ is 0, it indicates that a secondary cell whose secondary cell index is X is deactivated. Note that R may be a reserved bit.

However, a specific method of activating or deactivating a secondary cell and of triggering a temporary RS via a MAC-CE has not been defined.

Therefore, in a MAC-CE, with respect to a plurality of secondary cells, an indication for activating the secondary cells and triggering a temporary RS may be available.

Figure 6:
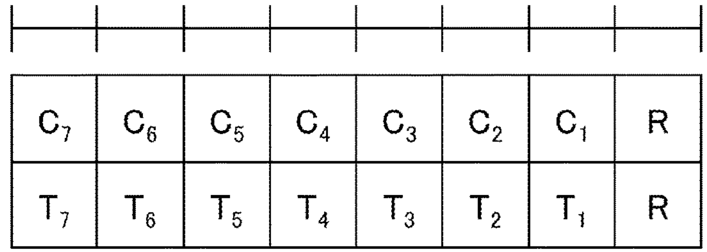
FIG. 6 is an example (1) of MAC-CE for activating a secondary cell in an embodiment of the present invention.

FIG. 6 is an example (1) of MAC-CE for activating secondary cells in an embodiment of the present invention. As illustrated in FIG. 6, $C_X$ is an indication of activation or deactivation with respect to a secondary cell whose secondary cell index is X, and $T_X$ is an indication of triggering a temporary RS with respect to a secondary cell whose secondary cell index is X. With respect to each of CX and TX, 1 may indicate activation or enabled, and 0 may indicate deactivation or disabled.

In an example illustrated in FIG. 6, one-bit indication is used as an indication $T_X$ for triggering a temporary RS for each CC. For example, whether a temporary RS is triggered may be indicated by one bit. That is, whether to perform secondary cell activation may be indicated by assuming that the terminal 20 uses a temporary RS.

In addition, information related to a trigger of a temporary RS may be indicated as an indication $T_X$ of MAC-CE for triggering a temporary RS. That is, $T_X$ may be two or more bits. In addition, information related to a trigger of a temporary RS may be indicated in advance via RRC signaling, or the like.

The information related to a trigger of a temporary RS may include one or more of information items described in 1) to 7) below.

1) Configuration ID (for example, a trigger state ID, a temporary RS configuration ID, etc.) Configuration information for each ID may be configured in advance via RRC signaling, or the like.
2) Trigger offset (time resource position of a temporary RS)
3) Frequency resource position of a temporary RS
4) BWP (Bandwidth part) index
5) Secondary cell index or secondary cell group index
6) Information related to QCL (Quasi co-located)
7) Number of transmissions of a temporary RS The indication $T_X$ of a trigger of a temporary RS may include information only for a secondary cell for which the secondary cell activation is indicated. For example, in a case where deactivation is indicated for $C_1$, $T_1$ need not be included in the MAC-CE.

Alternatively, information for all secondary cells may be included in the indication $T_X$ of a trigger of a temporary RS. In a case where information for all secondary cells is included in $T_X$, the terminal 20 may ignore an indication $T_X$ of a trigger of a temporary RS for a secondary cell for which deactivation is indicated.

Note that the secondary cell index X may be an index for a single secondary cell, or may be an index for a secondary cell group, and the secondary cell group may be configured in advance.

Further, in a MAC-CE, with respect to a specified secondary cell or a secondary cell group, activating of a secondary cell and triggering of a temporary RS may be indicated.

Figure 7:
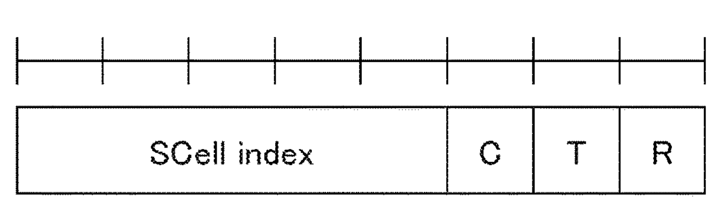
FIG. 7 is an example (2) of MAC-CE for activating a secondary cell in an embodiment of the present invention.

FIG. 7 is an example (2) of MAC-CE for activating secondary cells in an embodiment of the present invention. As illustrated in FIG. 7, C is an indication of activation or deactivation with respect to a secondary cell that is specified by a secondary cell index, and T is an indication of triggering a temporary RS with respect to the secondary cell that is specified by the secondary cell index. With respect to both C and T, 1 may indicate activation or enabled, and 0 may indicate deactivation or disabled.

In an example illustrated in FIG. 7, one-bit indication is used as an indication T for triggering a temporary RS for each CC. For example, whether a temporary RS is triggered using one bit may be indicated. That is, whether to perform secondary cell activation may be indicated by assuming that the terminal 20 uses a temporary RS.

In addition, information related to a trigger of a temporary RS may be indicated as an indication $T_X$ of MAC-CE for triggering a temporary RS. That is, T may be two or more bits. In addition, information related to a trigger of a temporary RS may be indicated in advance via RRC signaling, or the like.

The information related to a trigger of a temporary RS may include one or more of information items described in 1) to 7) below.

1) Configuration ID (for example, a trigger state ID, a temporary RS configuration ID, etc. Configuration information for each ID may be configured in advance via RRC signaling, or the like.)
2) Trigger offset (time resource position of a temporary RS)
3) Frequency resource position of a temporary RS
4) BWP (Bandwidth part) index
5) Secondary cell index or secondary cell group index
6) Information related to QCL (Quasi co-located)
7) Number of transmissions of a temporary RS An indication C for activating or deactivating a secondary cell may be included or need not be included in a MAC-CE. In a case where C is not included in a MAC-CE, when this MAC-CE is indicated, it may be assumed that the secondary cell corresponding to the specified secondary cell index is to be activated.

Note that the secondary cell index may be an index for a single secondary cell, or may be an index for a secondary cell group, and the secondary cell group may be configured in advance.

Further, in a MAC-CE, with respect to a plurality of secondary cells, an indication for triggering a temporary RS may be available.

Figure 8:
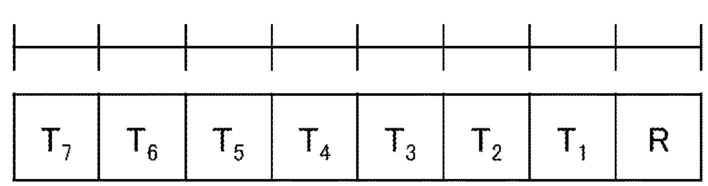
FIG. 8 is an example (3) of MAC-CE for activating a secondary cell in an embodiment of the present invention.

FIG. 8 is an example (3) of MAC-CE for activating secondary cells in an embodiment of the present invention. As illustrated in FIG. 8, $T_X$ is an indication of a trigger of a temporary RS for the secondary cell with a secondary cell index X. With respect to $T_X$, 1 may indicate activation or enabled, and 0 may indicate deactivation or disabled.

In an example illustrated in FIG. 8, one-bit indication is used as an indication $T_X$ for triggering a temporary RS for each CC. For example, whether a temporary RS is triggered using one bit may be indicated. That is, whether to perform secondary cell activation may be indicated by assuming that the terminal 20 uses a temporary RS.

In addition, information related to a trigger of a temporary RS may be indicated as an indication $T_X$ of MAC-CE for triggering a temporary RS. That is, $T_X$ may be two or more bits. In addition, information related to a trigger of a temporary RS may be indicated in advance via RRC signaling, or the like.

The information related to a trigger of a temporary RS may include one or more of information items described in 1) to 7) below.

1) Configuration ID (for example, a trigger state ID, a temporary RS configuration ID, etc.) Configuration information for each ID may be configured in advance via RRC signaling, or the like.
2) Trigger offset (time resource position of a temporary RS)
3) Frequency resource position of a temporary RS
4) BWP (Bandwidth part) index
5) Secondary cell index or secondary cell group index
6) Information related to QCL (Quasi co-located)
7) Number of transmissions of a temporary RS Note that the secondary cell index X may be an index for a single secondary cell, or may be an index for a secondary cell group, and the secondary cell group may be configured in advance.

Further, the MAC-CE for indicating activation or deactivation of a secondary cell may be included in PDSCH that includes a MAC-CE illustrated in FIG. 8. The indication $T_X$ of a trigger of a temporary RS may include information only for a secondary cell for which the secondary cell activation is indicated. For example, in a case where deactivation is indicated for the secondary cell index 1, $T_1$ need not be included in the MAC-CE. Alternatively, information for all secondary cells may be included in the indication $T_X$ of a trigger of a temporary RS. $T_X$ may include information for all secondary cells. In a case where information for all secondary cells is included in $T_X$, the terminal 20 may ignore an indication $T_X$ of a trigger of a temporary RS for a secondary cell for which deactivation is indicated. In addition, it may be assumed that activation is indicated for a secondary cell to which a trigger of a temporary RS is indicated via an indication $T_X$ for triggering a temporary RS in the MAC-CE.

Figure 9:
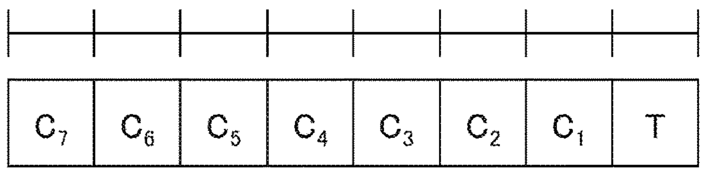
FIG. 9 is an example (4) of MAC-CE for activating a secondary cell in an embodiment of the present invention.
Figure 10:
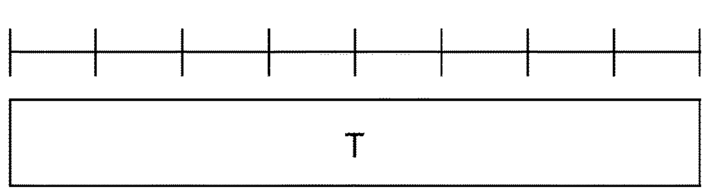
FIG. 10 is an example (5) of MAC-CE for activating a secondary cell in an embodiment of the present invention.

In addition, in a MAC-CE, a trigger of a temporary RS may be indicated to all secondary cells or to a secondary cell to which activation is indicated. FIG. 9 is an example (4) of MAC-CE for activating secondary cells in an embodiment of the present invention. FIG. 10 is an example (5) of MAC-CE for activating secondary cells in an embodiment of the present invention. As illustrated in FIG. 9, $C_X$ is an indication of activation or deactivation with respect to a secondary cell corresponding to a secondary cell index X. As illustrated in FIG. 9 and FIG. 10, T is an indication of a trigger of a temporary RS. With respect to both $C_X$ and T, 1 may indicate activation or enabled, and 0 may indicate deactivation or disabled. FIG. 10 illustrates an example in which T is indicated by a MAC-CE that is different from the MAC-CE that is used for an indication for activating or deactivating a secondary cell.

An indication of a trigger of a temporary RS illustrated in FIG. 9 and FIG. 10 is used as an indication without distinguishing secondary cells. Information related to a trigger of a temporary RS may be indicated for each secondary cell in advance via RRC signaling, or the like.

In an example illustrated in FIG. 9, one-bit indication is used as an indication T for triggering a temporary RS. For example, whether a temporary RS is triggered using one bit may be indicated. That is, whether to perform secondary cell activation may be indicated by assuming that the terminal 20 uses a temporary RS.

In addition, information related to a trigger of a temporary RS may be indicated as an indication T of MAC-CE for triggering a temporary RS. That is, T may be two or more bits. T is illustrated as one bit in FIG. 9 and T is illustrated as eight bits in FIG. 10, but T may be illustrated as different bits. In addition, information related to a trigger of a temporary RS may be indicated in advance via RRC signaling, or the like.

The information related to a trigger of a temporary RS may include one or more of information items described in 1) to 8) below.

1) Configuration ID (for example, a trigger state ID, a temporary RS configuration ID, etc. Configuration information for each ID may be configured in advance via RRC signaling, or the like.)
2) Trigger offset (time resource position of a temporary RS)
3) Frequency resource position of a temporary RS
4) BWP (Bandwidth part) index
5) Secondary cell index or secondary cell group index
6) Information related to QCL (Quasi co-located)
7) Number of transmissions of a temporary RS
8) Information indicating whether a temporary RS is to be triggered for each secondary cell (or for each secondary cell group)

Note that the secondary cell index X may be an index for a single secondary cell, or may be an index for a secondary cell group, and the secondary cell group may be configured in advance.

Note that, in a case where an indication of information related to a trigger of a temporary RS is performed by MAC-CE as illustrated in FIG. 9 and FIG. 10, the information related to a trigger of a temporary RS may be assumed as common information related to a trigger of a temporary RS for all of the secondary cells or for all secondary cells whose activation is indicated in the same MAC-CE (or in the same PDSCH).

When an indication of information related to a trigger of a temporary RS is indicated in advance via RRC signaling, or the like, different information related to a trigger of a temporary RS may be indicated for each secondary cell or for each secondary cell group.

For example, in a case where it is indicated that a temporary RS is to be triggered by T in a MAC-CE, activation of a secondary cell may be performed using a temporary RS by assuming that the temporary RS is triggered with respect to all of the secondary cells or with respect to all secondary cells whose activation is indicated in the same MAC-CE (or in the MAC-CE included in the same PDSCH).

Alternatively, one or more secondary cells that can use the temporary RS may be configured in advance via RRC signaling, or the like. With respect to the configured secondary cells, secondary cell activation using a temporary RS may be performed, and, with respect to the secondary cells that are not configured, secondary cell activation may be performed without using a temporary RS.

In a case where a trigger offset of a temporary RS is indicated by T in the MAC-CE, secondary cell activation using a temporary RS may be performed by using the same trigger offset value with respect to all of the secondary cells or with respect to all secondary cells for which activation is indicated by the same MAC-CE (or the MAC-CE included in the same PDSCH).

In addition, a trigger offset value that is used when a temporary RS is triggered may be configured for each secondary cell or for each secondary cell group in advance via RRC signaling, or the like. In a case where the temporary RS is triggered based on the configured value, secondary cell activation using a temporary RS may be performed by using a different trigger offset for each secondary cell.

Note that, in a case where an indication of information related to a trigger of a temporary RS illustrated in FIG. 9 or FIG. 10 is indicated by a MAC-CE, common indexes of information related to a trigger of a temporary RS may be assumed for all of the secondary cells or for all secondary cells whose activation is indicated in the same MAC-CE (or in the same PDSCH). For example, the indexes may be common between the secondary cells, and values to be applied in actuality may be different between the secondary cells.

Which value is to be used by each secondary cell may be configured for each index in advance via RRC signaling, or the like. For example, a trigger offset value and a corresponding index that are used when a temporary RS is triggered may be configured in advance for each secondary cell or for each secondary cell group via RRC signaling, or the like. When a temporary RS is triggered, an index (for example, index #1) that is common between the secondary cells may be indicated via a MAC-CE, and activation of a secondary cell may be performed using the temporary RS by using a trigger offset value corresponding to the index specified for each secondary cell (for example, index #1). That is, trigger offset values that are different between the secondary cells may be enabled to be used.

Note that, when a secondary cell index is indicated via a MAC-CE illustrated in FIG. 7, an operation that is the same as an operation at the time when a MAC-CE illustrated in FIG. 9 or FIG. 10 is indicated may be performed in a case where the secondary cell index is not indicated or in a case where the secondary cell index is a specific value.

Figure 11:
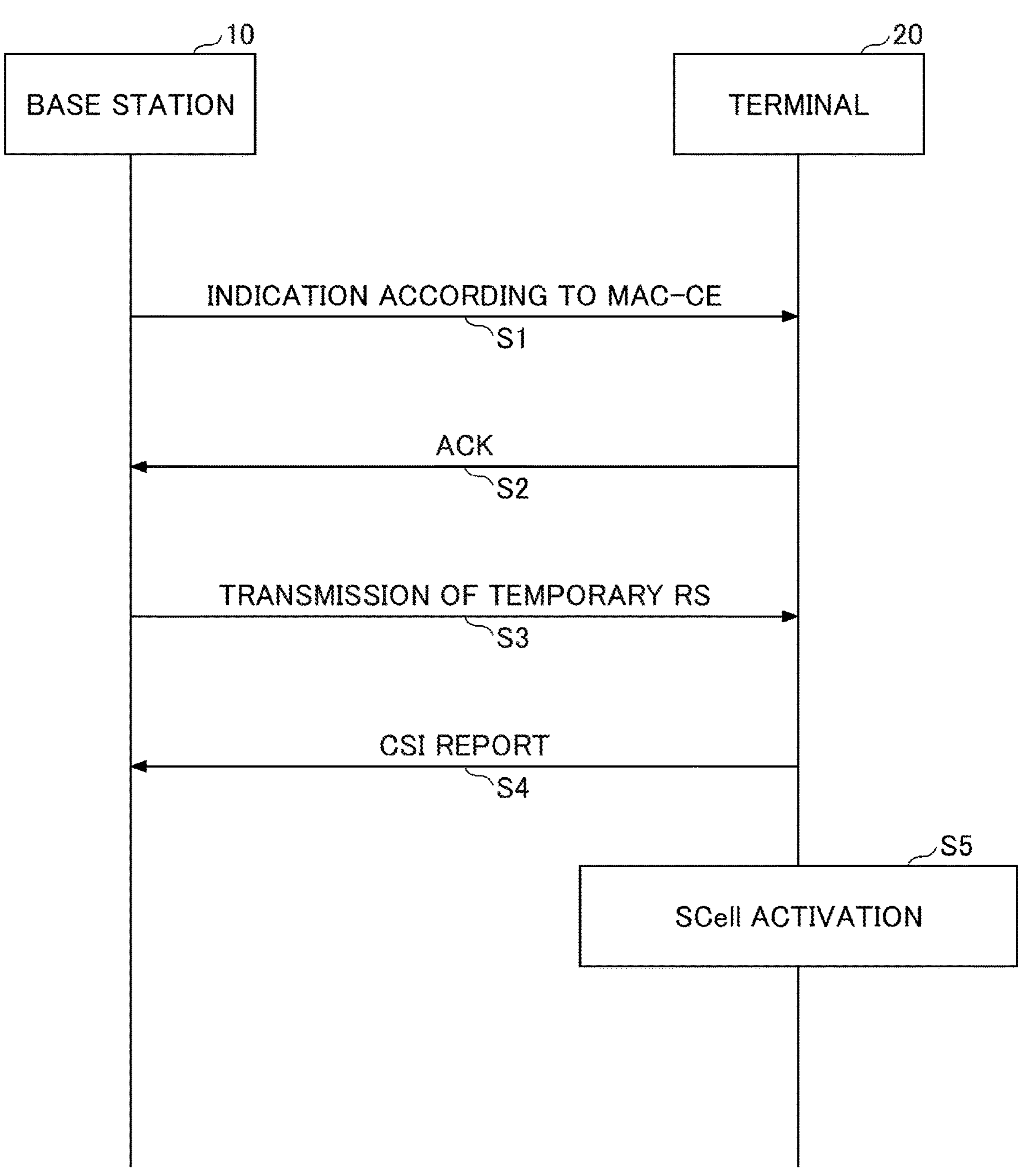
FIG. 11 is a sequence diagram illustrating an example of an activation of a secondary cell in an embodiment of the present invention.

FIG. 11 is a sequence diagram illustrating an example of an activation of a secondary cell in an embodiment of the present invention. In step S1, the base station 10 transmits an indication to the terminal 20 via a MAC-CE. The MAC-CE may be a MAC-CE illustrated in FIGS. 6 to 10. In subsequent step S2, the terminal 20 transmits an ACK to the base station 10. In subsequent step S3, the terminal 20 receives a temporary RS from the base station 10. The terminal 20 may perform synchronization and/or measurement using the temporary RS. In subsequent step S4, the terminal 20 transmits a CSI report to the base station 10, based on a measurement result of the temporary RS. In subsequent step S5, the terminal 20 performs activation of a secondary cell.

According to an embodiment of the present invention, when activating a secondary cell, the terminal 20 can shorten the secondary cell activation delay by receiving a MAC-CE including information related to a trigger of a temporary RS and by using the temporary RS in lieu of an SSB.

That is, the delay related to the secondary cell activation can be shortened in a wireless communication system.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only one of the functions in an embodiment of the present invention.

<Base Station 10>

Figure 12:
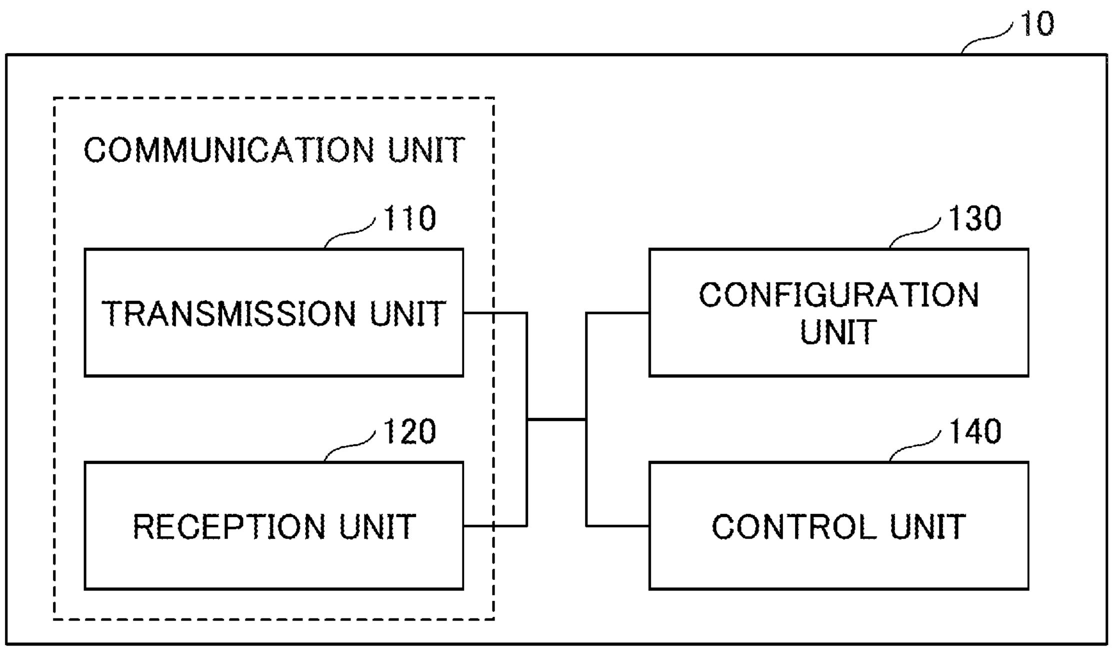
FIG. 12 is a drawing illustrating an example of a functional structure of a base station 10 in an embodiment of the present invention.

FIG. 12 is a diagram illustrating an example of a functional configuration of the base station 10. As shown in FIG. 12, the base station 10 includes a transmission unit 110, a reception unit 120, a configuration unit 130, and a control unit 140. The functional structure illustrated in FIG. 12 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 performs, for example, resource allocation and control of the entire base station 10. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 13:
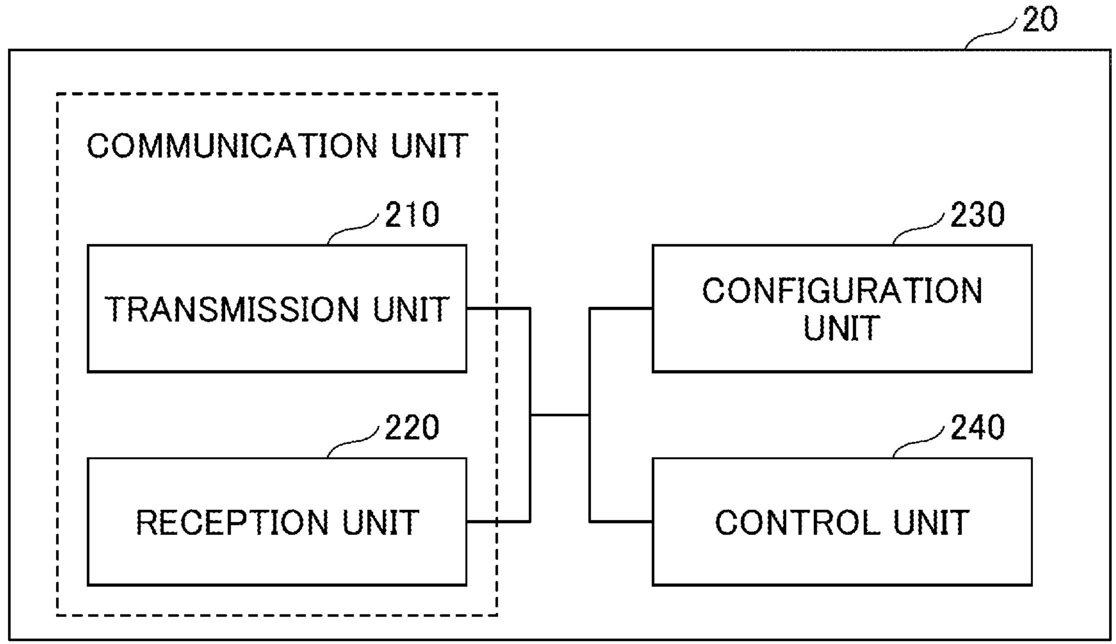
FIG. 13 is a drawing illustrating an example of a functional structure of a terminal 20 in an embodiment of the present invention.

FIG. 13 is a diagram illustrating an example of a functional configuration of the terminal 20. As shown in FIG. 13, the terminal 20 includes a transmission unit 210, a reception unit 220, a configuration unit 230, and a control unit 240. The functional structure illustrated in FIG. 13 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device if necessary. In addition, the configuration unit 230 also stores pre-configured configuration information. The control unit 240 controls the entire terminal 20. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure)

In the above functional structure diagrams used for describing an embodiment of the present invention (FIG. 12 and FIG. 13), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to perform transmission is called a transmitting unit or a transmitter. In either case, as described above, the implementation method is not particularly limited.

Figure 14:
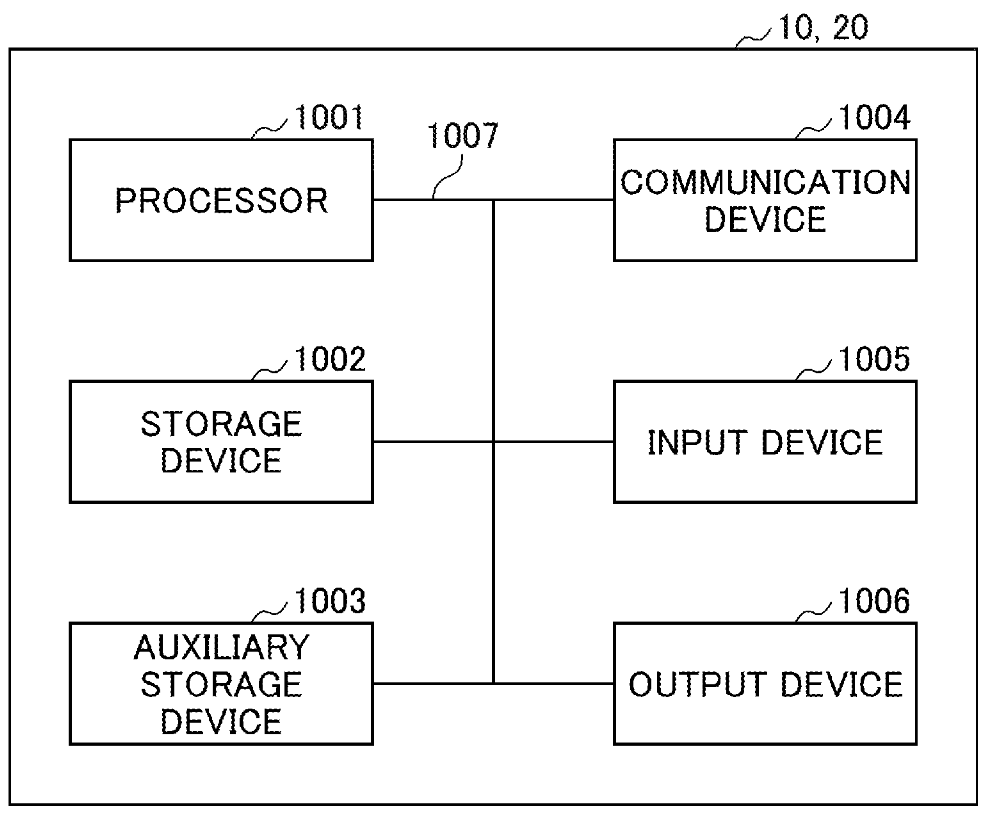
FIG. 14 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 14 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 12 may be realized by control programs that are stored in the storage device 1002 and are executed by the processor 1001. Further, for example, the control unit 240 of the terminal 20 illustrated in FIG. 13 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may include a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and the terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive, from a base station, an indication of activation or deactivation of a secondary cell and a trigger indication of a temporary RS (Reference Signal) via a single MAC-CE (Medium Access Control-Control Element); a control unit configured to perform synchronization and measurement in the secondary cell by using the temporary RS, based on the trigger indication in a case where the indication is for activating the secondary cell; and a transmission unit configured to transmit, to the base station, a CSI (Channel State Information) report based on a measurement result of the temporary RS.

According to the above-described configuration, when activating a secondary cell, the terminal 20 can shorten the secondary cell activation delay by receiving a MAC-CE including information related to a trigger of a temporary RS and by using the temporary RS in lieu of an SSB. That is, the delay related to the secondary cell activation can be shortened in a wireless communication system.

The trigger indication may indicate whether the temporary RS is to be used. According to the above-described configuration, when activating a secondary cell, the terminal 20 can shorten the secondary cell activation delay by receiving a MAC-CE including information related to a trigger of a temporary RS and by using the temporary RS in lieu of an SSB.

The trigger indication may be configured for the secondary cell to be activated according to the indication. According to the above-described configuration, when activating a secondary cell, the terminal 20 can shorten the secondary cell activation delay by receiving a MAC-CE including information related to a trigger of a temporary RS and by using the temporary RS in lieu of an SSB.

The trigger indication may be configured in common for all secondary cells to be activated according to the indication. According to the above-described configuration, when activating a secondary cell, the terminal 20 can shorten the secondary cell activation delay by receiving a MAC-CE including information related to a trigger of a temporary RS and by using the temporary RS in lieu of an SSB.

The control unit may obtain a time resource position or a frequency resource position of the temporary RS, based on the trigger indication. According to the above-described configuration, when activating a secondary cell, the terminal 20 can shorten the secondary cell activation delay by receiving a MAC-CE including information related to a trigger of a temporary RS and by using the temporary RS in lieu of an SSB.

In addition, according to an embodiment of the present invention, a communication method performed by a terminal is provided. The communication method includes: receiving, from a base station, an indication of activation or deactivation of a secondary cell and a trigger indication of a temporary RS (Reference Signal) via a single MAC-CE (Medium Access Control-Control Element); performing synchronization and measurement in the secondary cell by using the temporary RS, based on the trigger indication in a case where the indication is for activating the secondary cell; and transmitting, to the base station, a CSI (Channel State Information) report based on a measurement result of the temporary RS.

According to the above-described configuration, when activating a secondary cell, the terminal 20 can shorten the secondary cell activation delay by receiving a MAC-CE including information related to a trigger of a temporary RS and by using the temporary RS in lieu of an SSB. That is, the delay related to the secondary cell activation can be shortened in a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain (OFDM (Orthogonal Frequency Division Multiplexing) symbols, SC-FDMA (Single Carrier Frequency Division Multiple Access) symbols, and the like). The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a receiver configured to receive, from a base station, an indication of activation or deactivation of a secondary cell and a trigger indication of a Tracking RS (TRS) via a single Medium Access Control-Control Element (MAC-CE); and a processor configured to activate the secondary cell by using a TRS corresponding to a TRS configuration ID included in the trigger indication in a case where the indication is an indication of activation of a secondary cell, wherein the receiver receives, from the base station via Radio Resource Control (RRC) signaling, a trigger offset, information related to Quasi co-location (QCL), and a number of transmissions, the trigger offset, the information related to QCL, and the number of transmissions being associated with the TRS configuration ID included in the trigger indication, and the processor applies the trigger offset, the information related to QCL, and the number of transmissions to reception of the TRS.

2. The terminal as claimed in claim 1, wherein the processor assumes that the trigger indication that is associated with a first secondary cell is to be included in the single MAC-CE in a case where the indication is an indication of activation of the first secondary cell, and assumes that the trigger indication that is associated with a second secondary cell is to be not included in the single MAC-CE in a case where the indication is an indication of deactivation of the second secondary cell.

3. A communication method performed by a terminal, the communication method comprising:

receiving, from a base station, an indication of activation or deactivation of a secondary cell and a trigger indication of a Tracking RS (TRS) via a single Medium Access Control-Control Element (MAC-CE);

activating the secondary cell by using a TRS corresponding to a TRS configuration ID included in the trigger indication in a case where the indication is an indication of activation of a secondary cell;

receiving, from the base station via Radio Resource Control (RRC) signaling, a trigger offset, information related to Quasi co-location (QCL), and a number of transmissions that are, the trigger offset, the information related to QCL, and the number of transmissions being associated with the TRS configuration ID included in the trigger indication; and applying the trigger offset, the information related to QCL, and the number of transmissions to reception of the TRS.

4. A base station comprising:

a transmitter configured to transmit, to a terminal, an indication of activation or deactivation of a secondary cell and a trigger indication of a Tracking RS (TRS) via a single Medium Access Control-Control Element (MAC-CE); and a processor configured to activate the secondary cell by using a TRS corresponding to a TRS configuration ID included in the trigger indication in a case where the indication is an indication of activation of a secondary cell, wherein the transmitter transmits, to the terminal via Radio Resource Control (RRC) signaling, a trigger offset, information related to Quasi co-location (QCL), and a number of transmissions that are, the trigger offset, the information related to QCL, and the number of transmissions being associated with the TRS configuration ID included in the trigger indication, and the processor applies the trigger offset, the information related to QCL, and the number of transmissions to transmission of the TRS.

5. A communication system comprising: a terminal; and a base station, wherein the terminal includes:

a receiver configured to receive, from the base station, an indication of activation or deactivation of a secondary cell and a trigger indication of a Tracking RS (TRS) via a single Medium Access Control-Control Element (MAC-CE); and a processor configured to activate the secondary cell by using a TRS corresponding to a TRS configuration ID included in the trigger indication in a case where the indication is an indication of activation of a secondary cell, wherein the receiver receives, from the base station via Radio Resource Control (RRC) signaling, a trigger offset, information related to Quasi co-location (QCL), and a number of transmissions that are, the trigger offset, the information related to QCL, and the number of transmissions being associated with the TRS configuration ID included in the trigger indication, and the processor applies the trigger offset, the information related to QCL, and the number of transmissions to reception of the TRS, and the base station includes:

a transmitter configured to transmit the indication and the trigger indication to the terminal; and a processor configured to activate the secondary cell by using a TRS corresponding to a TRS configuration ID included in the trigger indication in a case where the indication is an indication of activation of a secondary cell, wherein the transmitter transmits the trigger offset, the information related to QCL, and the number of transmissions to the terminal via the RRC signaling, and the processor applies the trigger offset, the information related to QCL, and the number of transmissions to transmission of the TRS.

* * * * *